Feb. 4, 1958
J. H. GRAYSON ET AL
2,822,133
VALVE STRUCTURE
Filed March 22, 1954
2 Sheets-Sheet 1
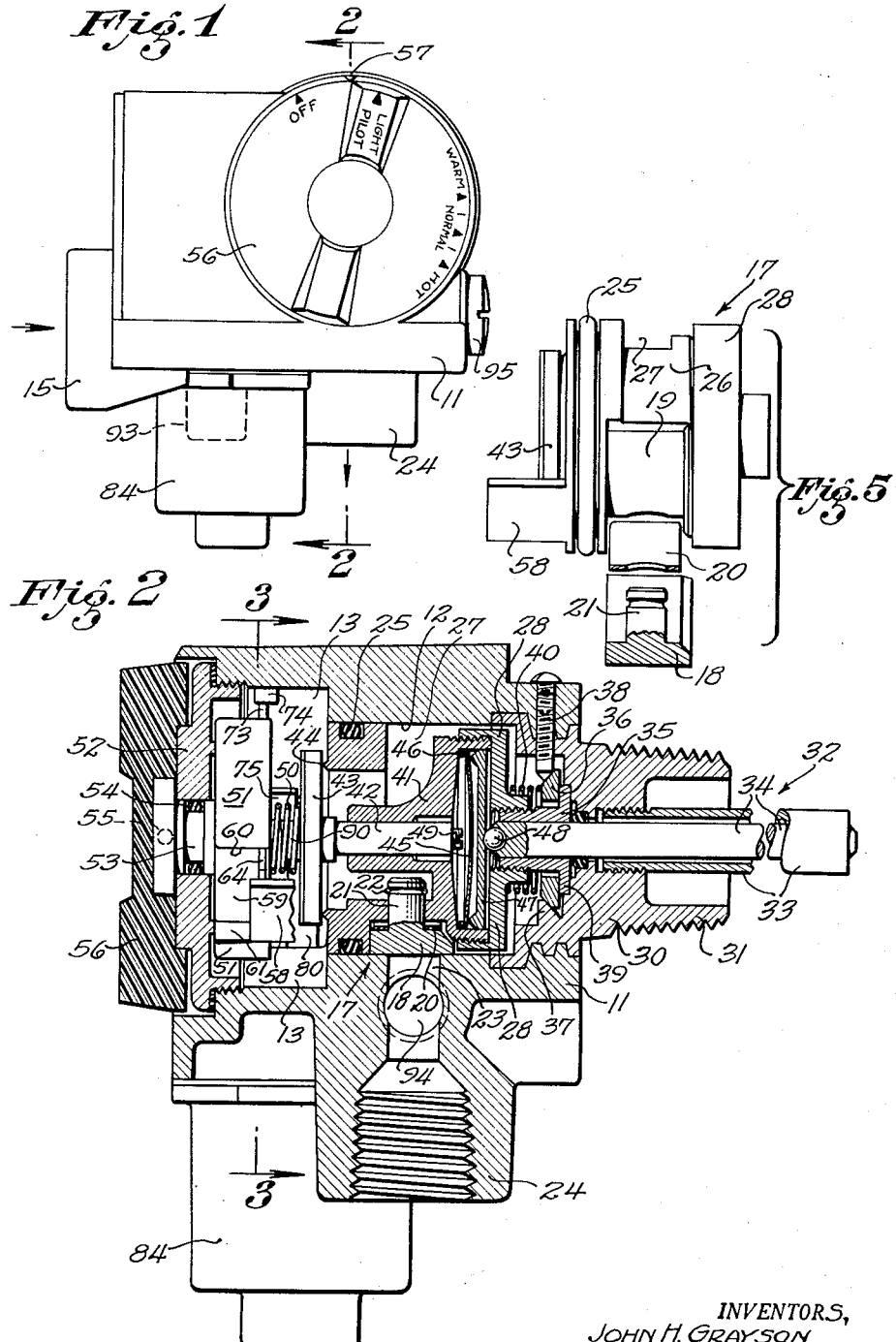
INVENTORS,
JOHN H. GRAYSON
WILLIAM A. RAY
RICHARD D. GRAYSON
By John H. Rouse,
ATTORNEY.

Feb. 4, 1958 — J. H. GRAYSON ET AL — 2,822,133
VALVE STRUCTURE
Filed March 22, 1954 — 2 Sheets-Sheet 2
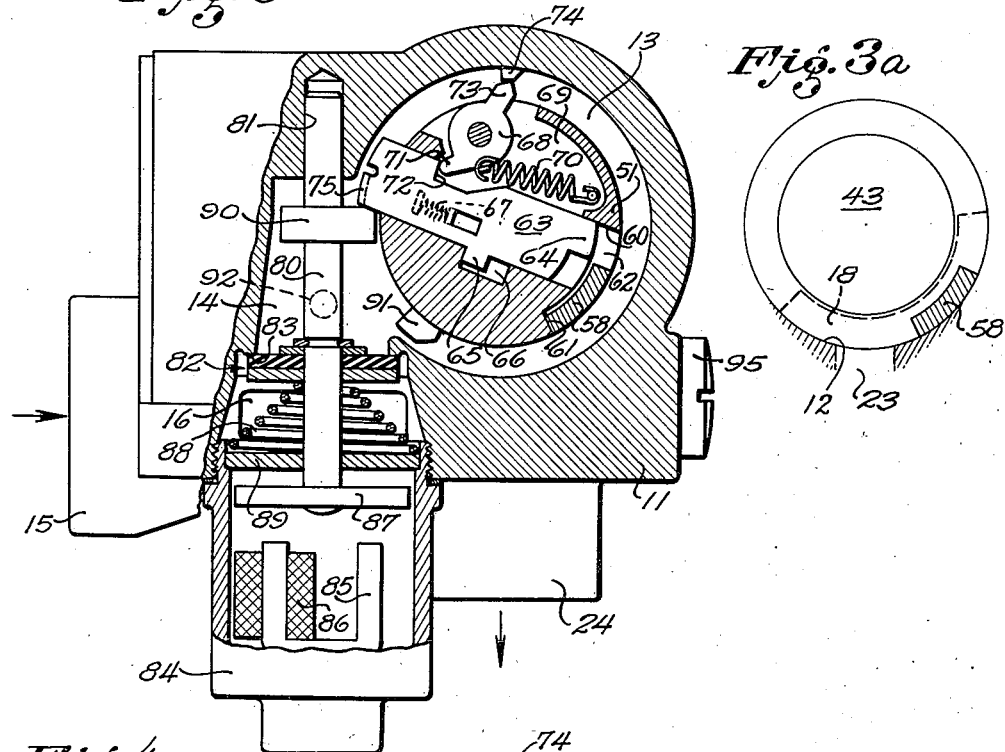
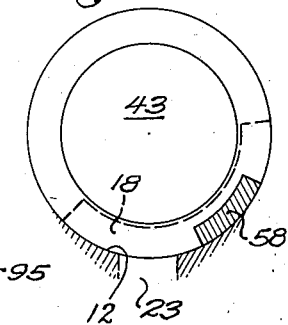
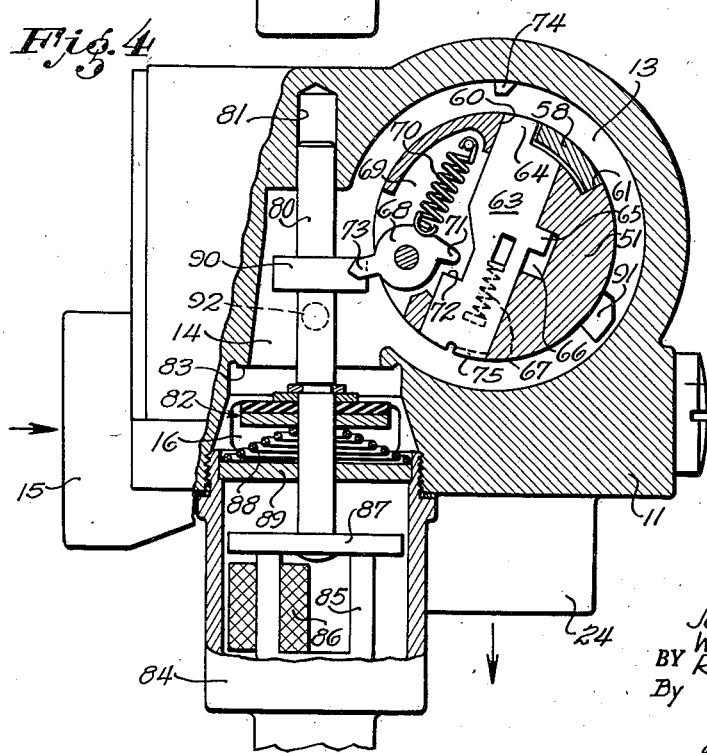
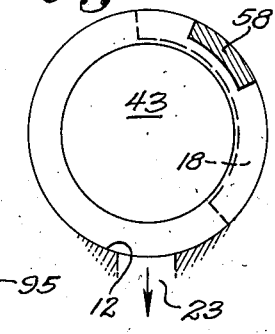
INVENTORS,
JOHN H. GRAYSON
WILLIAM A. RAY
BY RICHARD D. GRAYSON
By John H. Rouse,
ATTORNEY.

United States Patent Office 2,822,133
Patented Feb. 4, 1958

2,822,133

VALVE STRUCTURE

John H. Grayson, Monrovia, William A. Ray, North Hollywood, and Richard D. Grayson, La Canada, Calif., assignors to General Controls Co., Glendale, Calif., a corporation of California Application March 22, 1954, Serial No. 417,842

20 Claims. (Cl. 236—21)

This invention relates to valve structures and more particularly to those of the type which include an apertured main closure member rotatable in a cavity or socket in a valve casing to control flow of fluid such as fuel gas; a supplemental control device such as a safety shut-off valve, pilot-burner valve, or a gas-igniter actuator; and a common operating member for rotating the main closure member and for operating the supplemental control device.

It is an object of this invention to provide a novel connection between the operating member and the main closure member such that these members are tightly interlocked during normal operation of the main closure member, but which connection permits free movement of the operating member relative to the main closure member during operation of the supplemental control device, so that the possibility of faulty operation of the supplemental control device as might be caused by normal friction in the main closure member, is avoided.

Another object, when the supplemental control device is of the manual-reset type, is to provide means, effective during the resetting operation, for preventing rotation of the main closure member to its open position until resetting of the supplemental control device has been accomplished.

Another object is to provide, in a system of the character described in the preceding paragraph, an arrangement whereby, upon successful completion of the resetting operation, rotation of the main closure member to open position can be accomplished by continued rotation of the operating member beyond the position to which it was rotated to reset the supplemental control device.

Another object is to provide means whereby rotation of the main closure member to its open position, as was described in the preceding paragraph, effects also operative adjustment of additional control means, such as a thermostatic valve controlling flow through the valve structure.

Another object is to provide a closure member, mounted for both rotary and axial movement in a cavity or socket in the valve casing, which comprises a closure element carried by the closure member and cooperating with an opening or port in the side wall of the cavity.

For full understanding of our invention, and further appreciation of its objects and advantages, reference is to be had to the following detailed description and accompanying drawing, and to the appended claims.

In the drawing:

Figure 1 is a front elevation of a valve structure embodying this invention;

Figure 2 is an enlarged sectional view taken along the line 2—2 of Fig. 1;

Figure 3 is a section taken generally along the line 3—3 of Fig. 2;

Figure 3a is a fragmentary view indicating the corresponding positions of certain parts of rotor unit 17 when the operating member 51 is in the position of Fig. 3;

Figures 4 and 4a are views similar to those of Figs. 3 and 3a but showing the parts in different positions assumed in operation; and Figure 5 is an elevational, and partly exploded, view of the rotor unit 17.

It is to be observed that the parts are shown in the same operative positions in Figs. 1, 2, 3, 3a and 5.

In the drawing, the numeral 11 indicates a valve casing having a cylindrical bore 12 which is enlarged at its left end (as viewed in Fig. 2) to provide a chamber 13. As can be seen in Figs. 3 and 4 the chamber 13 has a lateral extension 14 which, when the parts are in the positions shown in Fig. 4, is in communication with the inlet 15 of the casing by way of a rectangular opening 16; a filter (not shown) being provided between the inlet and opening 16.

In the bore 12 is a hollow closure member or rotor unit 17 (shown per se in Fig. 5) having a closure element or shoe 18 fitting freely in a conforming recess 19 which extends through an angle of about 140° around the periphery of the rotor. The shoe 18 is urged outwardly into seating engagement with the wall of bore 12 by the force of a leaf-spring 20, outward movement of the shoe being limited by a pin 21 integral with the shoe and projecting through an opening in the wall of the rotor to the hollow interior thereof where it is provided with a snap-ring 22. Shoe 18 cooperates with a cylindrical passage or port 23 in the side wall of the casing at its bottom, which passage leads to the main outlet connection 24 of the casing.

At its left or inlet end the rotor unit 17 is provided with an O-ring seal 25. The portion 26 of the rotor at its right is of reduced diameter and has an opening 27 through its side wall. Threaded tightly on the end of portion 26 is a cupped disk 28.

The casing 11 is of die-cast construction and has in its back, at the right of the rotor unit as viewed in Fig. 2 and coaxial therewith, a hollow hard-metal virtually-integral insert 30 having a threaded extension 31 by means of which the valve structure can be mounted on a water heater of the storage-tank type. Connected to the insert 30 is a thermostat 32 adapted to be subjected to the water in the storage tank and comprising a tube 33, of metal having a high coefficient of thermal expansion, tightly threaded in a central opening through the insert, and a rod 34, of metal having a negligible coefficient of expansion, secured at its outer end to the tube and projecting within a sleeve 35 threaded (left-hand) in an opening through a thickened central portion of the rotor-unit disk 28.

Within an inner enlargement of the opening through insert 30, and around sleeve 35, is a disk 36 having a beveled edge with opposite sides of which a lip 37 on insert 30 and a screw 38 cooperate. By tightening screw 38 the disk 36 is forced against the flange portion 39 of sleeve 35 thereby clamping the same against the insert. A compression spring 40, interposed between disk 36 and the rotor-unit disk 28, serves to maintain snug engagement of the threaded connection between disk 28 and sleeve 35, even when screw 38 is loosened for a purpose to be described.

Inside the rotor 17 is an integral central boss 41 having an axial opening guidingly receiving the stem 42 of a disk-shaped closure 43 which cooperates with an annular knifed-edged seat 44 formed on the left end of the rotor. At its right the boss 41 is recessed to provide, with disk 28, a shallow compartment into which the closure-stem 42 extends. Within this compartment are conventional snap-action means for operating the closure 43. These means consist of a resilient convexo-concave disk 45 which is fulcrumed closely adjacent its periphery on a ring 46 and is engaged on its opposite side, and slightly closer toward its center, by an annular tapered ridge raised from a disk 47 against the center of which a ball 48, fastened to the inner end of thermostat rod 34, bears.

Upon cooling of the thermostat, tube 33 contracts so that rod 34 is moved inwardly and applies, through disk 47, force to the snap-disk 45 causing it to flex and finally snap overcenter into engagement with an adjusting screw 49 on stem 42, thereby moving closure 43 to open position out of engagement with its seat 44. With subsequent rise of temperature at the thermostat, the consequent expansion of tube 33 and withdrawal of rod 34 permits the snap-disk 45 to return to its previous position under its own resilience and aided by the force of a spring 50 compressed between closure 43 and a cylindrical member 51 for operating rotor 17 and rotatably mounted in the chamber 13.

The left end of chamber 13 is closed by a screw-plate 52 having a central opening through which a headed stem 53 is inserted and securely attached to the operating member 51, the clearance space around the stem being sealed by an O-ring 54. Attached to the head of stem 53, as by a pin or screw 55, is a knob or dial 56 for manually rotating the operating member. As can be seen in Fig. 1, this knob bears legends which, when their associated triangular pointers are in register with a similar mark 57 on the casing, indicate the control conditions established as the knob is rotated.

The operating member 51 and the rotor unit 17 are operatively interconnected by a lug 58 integral with the rotor and projecting into an opening or slot 59 cut in the periphery of the operating member and whose angular limits are indicated at 60 and 61. As can be seen in Figs. 3 and 4, the lug 58 is of such dimension relative to slot 59 that there is a space 62 between it and the slot-wall 60 when the parts are in the positions shown in Fig. 3 so that rotation of the operating member relative to the rotor unit can then occur in the range permitted by space 62.

Reciprocably mounted inside the operating member 51 is an arm 63 having an end portion 64 adapted, when the parts are in the positions shown in Fig. 4, to close the space 62 so that relative rotation between the operating member and the rotor unit is prevented and rotation of knob 56 then effects, through the operating member and connecting lug 58, corresponding rotation of the rotor unit.

Movement of arm 63 is limited by a lateral projection 65 of the arm cooperating with the ends of a slot 66 in the operating member, the arm being biased to its retracted position, as shown in Fig. 4, by the force of a spring 67 compressed between abutments on the arm and on the operating member. For operating arm 63 there is a lever 68 which is pivotally mounted on a plate 69 covering the bottom (as viewed in Figs. 3 and 4) of the operating member and biased by a tension spring 70 to its position as shown in Fig. 4. The inner end portion 71 of the lever is engageable with a shoulder 72 on arm 63 formed by a notch cut therein; the outer portion 73 of the lever, which normally projects radially from the operating member, being engageable with a projection 74 on the side wall of chamber 13 when the operating member is rotated. At its left (as viewed in Fig. 3) the arm 63 has a bent-down portion 75 whose function will presently be described.

In the lateral extension 14 of chamber 13 is a supplemental control device or safety valve of the manual-reset type which comprises a stem 80 reciprocably guided in an opening 81 in the thickened back wall of the casing and carrying a closure unit 82 cooperable with an annular seat 83 formed on the casing around the lower end of the chamber extension 14. Threaded in the open bottom end of this extension is a cup-shaped housing 84 wherein is mounted an electromagnet comprising a U-shaped core 85 and coil 86 adapted to be energized by means external to the valve structure and responsive to a controlling condition such as existence of flame at a pilot burner; the arrangement being such that the electromagnet is energized only while said condition is normal or safe, as while the pilot burner is alight. The electromagnet cooperates with an armature 87 secured to the bottom end of stem 80 and is adapted, when the armature is mechanically brought into engagement with the pole faces of the core, to magnetically hold the stem in its position as shown in Fig. 4 against the force of a spring 88 compressed between the closure unit 82 and a disk 89 which rests on a shoulder formed in the mouth of housing 84. Rigidly secured to stem 80 is a bar 90 whose underside (with reference to Figs. 3 and 4) is adjacent to a wall of chamber-extension 14 so that rotation of stem 80 is prevented. The bar 90 is positioned for engagement by the bent-down portion 75 of arm 63 when the operating member 51 is rotated in counterclockwise direction toward its position as shown in Fig. 3. The bar 90 is engageable also by a lug 91, integral with operating member 51, when that member is rotated in clockwise direction for a purpose to be described.

A small passage 92 leads from the chamber-extension 14 to a pipe connection indicated at 93 in Fig. 1. This passage is adapted to supply gas to a pilot burner when the valve structure is employed for controlling the operation of a gas-consuming automatic water heater, which is the intended purpose of the structure in its specific form as shown. In the main outlet passage 23 is an adjustable flow restriction in the form of a threaded plug 94 (Fig. 2), the outer end of the opening for this plug being closed by a screw cap 95.

Operation

The parts are shown in each of Figs. 1, 2, 3, 3a and 5 in the positions assumed subsequent to deenergization of electromagnet 85, 86 and immediately prior to the resetting operation. It will be observed that flow from inlet 15, 16 to the interior of the valve structure is now obstructed since the supplemental or safety closure unit 82 is seated. As can be seen in Figs. 2 and 3a, the main outlet 23, 24 also is closed by the closure element 18 carried by rotor unit 17.

It is to be assumed that, by means of knob 56, the operating member 51 has been turned in counterclockwise direction from "off" to the position shown. In this operation the outer portion 73 of lever 68 was brought into engagement with casing-projection 74 so that continued counterclockwise rotation of the operating member effected rocking of the lever and projection of arm 63 to its position as shown in Fig. 3 wherein the bent-down portion 75 of the arm is in engagement with the bar 90 on valve stem 80.

By farther rotation of the operating member to "Light pilot" position the stem 80 is moved downwardly until the armature 87 engages the pole faces of core 85 (the rotor unit 17 also moving because of engagement of lug 58 with shoulder 61). In this rotation of the operating member the portion 73 of lever 68 passes beyond the casing projection 74 so that the lever returns to its biased position out of engagement with arm 63, this arm now being held in projected position solely by friction or hooking-action between its portion 75 and bar 90.

If the electromagnet is already energized when the operating member is brought to "Light pilot" position, the armature and stem 80 will then be magnetically held against the force of spring 88. However, in the particular arrangement shown energization of the electromagnet is dependent on heat produced by the flame of a pilot burner for igniting the main water-heater burner, as is common practice. Gas can now pass to this pilot burner through passage 92 since the safety closure-unit 82 is unseated. It is necessary to manually hold the operating member in "Light pilot" position for a brief interval after lighting the pilot burner until proper energization of the electromagnet is effected, whereupon the operating-member knob is released. When this is done, the arm 63 is retracted by the force of its bias spring 67 since there is no longer any significant amount of friction between the arm-portion 75 and bar 90. In the retraction of arm 63 its end portion 64 enters and closes the space 62, thereby locking the operating member 51 to the rotor unit 17 through lug 58.

Since arm 63 is now free from engagement with bar 90, the operating member can be rotated farther in counterclockwise direction to bring the rotor unit or closure member 17 to its open position wherein the shoe or closure element 18 is in unobstructing relation to the outlet port 23, as can be seen in Fig. 4a. In this rotation of the rotor unit it is also moved axially because of its threaded connection with sleeve 35 which is stationary relative to the casing. Since this threaded connection is a left-hand one, the counterclockwise rotation of the rotor unit has the same effect as lengthening of the thermostat rod 34 so that the setting of the thermostat is progressively raised as the knob is rotated to the selected one of its "Warm," "Normal" or "Hot" positions. The parts are then in the positions generally as shown in Figs. 4 and 4a wherein flow through the valve structure is controlled automatically by thermostat 33, 34 in the usual manner.

If, during the resetting operation as described above, the knob is released before the electromagnet is energized sufficiently to hold the armature, stem 80 will return under the force of spring 83 to its position wherein the safety closure is again seated; this return movement of stem 80 effecting, through bar 90 and arm-portion 75 which remains frictionally interlocked, clockwise rotation of the operating member 51 to its position as shown in Fig. 3. In this rotation of the operating member it moves freely relative to the rotor unit because of the lost-motion permitted between lug 58 and shoulder 60 while arm 63 is in projected position. This lost-motion prevents any possibility of stem 80 failing to return to safety shut-off position as might occur, in the absence of the lost-motion arrangement, because of the necessary high degree of friction between the rotor unit or closure element 18 and the side wall or outlet seat of bore 12.

Since the arm 63 is now retained in projected position by engagement of its end portion 64 with the rotor-lug 58, the resetting operation can again be attempted. It will be observed that until resetting of the safety closure 82 has been successfully accomplished, rotation of the rotor or closure member 17 to open position is prevented by engagement of arm 63 with bar 90. The operator is thus informed that the resetting operation has not been properly performed, or that some fault still exists in the means for energizing the electromagnet. In practice, the operator is instructed to hold the knob in "Light pilot" position for a given period of time after lighting the pilot burner, and then merely to relax his grip on the knob and note whether it tends to return toward "off" position. Any such tendency of the knob to return toward "off" indicates that it has not been held long enough in "Light pilot" position. By such procedure, extinguishment of the pilot burner (by closing of the safety closure) is avoided.

In the event of deenergization of the electromagnet while the burner system is in normal operation, as due to extinguishment of the pilot-burner flame, the consequent release of the armature effects seating of the safety closure and thereby obstruction of flow of gas to the main and pilot burners. To perform the required resetting operation, it is then necessary first to rotate the knob clockwise to "off" so as to bring the lever-portion 73 to the right of the casing-projection 74 (the lever rocking freely counterclockwise as its portion 73 passes the casing projection) so that the lever is in condition for projecting arm 63 in subsequent counterclockwise rotation of the knob as previously described.

If, for some reason, it is desired to shut-off the system while it is in normal operating condition, the knob is turned to "off" so that lug 91, fixed to the operating member, engages the lower side of bar 90 and forces the armature out of engagement with core 85, thereby effecting closing of the safety closure 82.

The lug 91 serves, by its engagement with bar 90, to stop rotation of the knob and associated parts at the "off" position; and also, by engagement with the casing projection 74, to stop rotation of the knob when the same is turned counterclockwise to a position slightly beyond the "Hot" index.

The temperature setting of thermostat 33, 34 may be adjusted to correspond with the dial markings by merely loosing screw 38, so that sleeve 35 is no longer clamped to casing-insert 30; and then rotating dial 56 in the proper direction. Because of the relatively tight threaded connection between rotor-disk 28 and sleeve 35 produced by the force of spring 46, these parts can rotate as a unit relative to the casing (while screw 38 is loose) to effect the desired adjustment of the thermostat setting. Sleeve 35 is then clamped in its new angular position by tightening screw 38.

The specific embodiment of our invention herein shown and described is obviously susceptible of modification without departing from the spirit of the invention, and we intend therefore to be limited only by the scope of the appended claims.

We claim as our invention:

1. In a valve structure: a casing having a passage therethrough; an apertured closure member mounted for rotation relative to said casing and so as to control flow through said passage; a rotatable member for operating said closure member and mounted on the casing coaxially with the closure member; one of said members having an opening extending in a direction substantially parallel to its axis of rotation and spaced therefrom; a connecting lug fixed to the other of the members and projecting into said opening, said lug being of such dimension relative to the opening that there is a space between the lug and a wall of the opening such as to permit relative rotation of the members through a limited range; a movable arm mounted on said one of the members for closing said space so that said relative rotation of the members is then prevented; means, including means fixed to the casing, for withdrawing said arm from said space upon rotation of the members to a predetermined position; supplemental means for influencing flow through said passage; and means providing a connection between the operating member and said supplemental means and arranged so that continued rotation of the members beyond said predetermined position effects operation of the supplemental means.

2. In a valve structure: a casing having a passage therethrough; an apertured closure member mounted for rotation relative to said casing and so as to control flow through said passage; a rotatable member for operating said closure member and mounted on the casing coaxially with the closure member; one of said members having an opening extending in a direction substantially parallel to its axis of rotation and spaced therefrom; a connecting lug fixed to the other of the members and projecting into said opening, said lug being of such dimension relative to the opening that there is a space between the lug and a wall of the opening such as to permit relative rotation of the members through a limited range; an arm for closing said space so that said relative rotation of the members is prevented, said arm being movably mounted on said one of the members and biased to space-closing position; means on said one member movable to operate said arm to space-opening position; means on the casing engageable by said operating means in the rotation of the members and arranged so as to effect movement of the operating means, and thereby operation of said arm to space-opening position, when the members are rotated to a predetermined position; supplemental means for influencing flow through said passage; and means providing a connection between the operating member and said supplemental means and arranged so that continued rotation of the members beyond said predetermined position effects operation of the supplemental means.

3. In a valve structure: a casing having a passage therethrough; an apertured closure member mounted for rotation relative to said casing and so as to control flow through said passage; a rotatable member for operating said closure member and mounted on the casing coaxially with the closure member; said operating member having an opening extending in a direction substantially parallel to its axis of rotation and spaced therefrom; a lug interconnecting the members and fixed to the closure member, said lug projecting into said opening and being of such dimension relative to the opening that there is a space between the lug and a wall of the opening such as to permit relative rotation of the members through a limited range; means for closing said space so that said relative rotation of the members is prevented, said space-closing means comprising an arm movably mounted on the operating member and biased to space-closing position; means pivotally mounted on the operating member for operating said arm to space-opening position; a projection on the casing engageable by said pivoted operating means in the rotation of the members and arranged so as to effect rocking of the operating means, and thereby operation of said arm to space-opening position, when the members are rotated to a predetermined position; supplemental means for influencing flow through said passage; and means providing a connection between the operating member and said supplemental means and arranged so that continued rotation of the members beyond said predetermined position effects operation of the supplemental means.

4. A valve structure according to claim 3, and wherein said arm is reciprocable, and said pivoted operating means comprises a lever having a portion projecting radially from the operating member and engageable with said casing-projection.

5. In a valve structure: a casing having a passage therethrough; an apertured closure member mounted for rotation relative to said casing and so as to control flow through said passage; a rotatable member for operating said closure member and operatively connected thereto; a supplemental device for influencing flow through said passage; means for operating said supplemental device comprising an arm mounted on said operating member and projectable therefrom to a position wherein it is operatively engageable with the device when the operating member is rotated; means on the operating member movable to project said arm to said position; and means on the casing engageable by said arm-projecting means in the rotation of the operating member and arranged so as to effect movement of the arm-projecting means, and thereby projection of the arm, when the members are rotated to a predetermined position.

6. In a valve structure: a casing having a passage therethrough; an apertured closure member mounted for rotation relative to said casing and so as to control flow through said passage; a rotatable member for operating said closure member and operatively connected thereto; a supplemental device for influencing flow through said passage; means for operating said device comprising an arm mounted on said operating member and movable from a retracted position, to which it is biased, to a projected position wherein it is operatively engageable with said device when the operating member is rotated in one direction; means pivotally mounted on the operating member for moving said arm to projected position; and means on the casing engageable by said arm-projecting means in the rotation of the operating member and arranged so as to effect rocking of the arm-projecting means, and thereby projection of the arm, when the operating member is rotated in said one direction to a predetermined position; said supplemental device and said arm, while interengaged, serving to limit continued rotation of the operating member in said one direction.

7. In a valve structure: a casing having a passage therethrough; an apertured closure member mounted for rotation relative to said casing and so as to control flow through said passage; a rotatable member for operating said closure member and operatively connected thereto; a supplemental device for influencing flow through said passage and biased to one controlling position; means for operating said device to an alternate position, comprising an arm reciprocably mounted on said operating member and movable from a retracted position, to which it is biased, to a projected position wherein it is operatively engageable with said device when the operating member is rotated in one direction; means movably mounted on the operating member for moving the arm to said projected position; and means on the casing engageable by said arm-projecting means in the rotation of the operating member and arranged so as to effect operation of the arm-projecting means, and thereby projection of the arm, when the operating member is rotated in said one direction to a predetermined position; the arrangement being such that continued rotation of the operating member effects engagement of the arm with said device and movement of the same to its alternate position; said device when in said alternate position serving, by its engagement with said arm, to prevent continued rotation of the operating member in said one direction.

8. A valve structure according to claim 7, and wherein said means on the casing engageable by said arm-projecting means is arranged so that it is disengaged from the arm-projecting means when, by continued rotation of said operating member in said one direction, said arm is brought into engagement with said device; and wherein friction between the arm and the device while the same are interengaged is sufficient to maintain their interengagement against the force biasing the arm to retracted position.

9. In a valve structure: a casing having a passage therethrough; an apertured closure member mounted for rotation relative to said casing and so as to control flow through said passage; a rotatable member for operating said closure member and mounted on the casing coaxially with the closure member; means operatively interconnecting said members; a supplemental device for influencing flow through said passage and biased to one controlling position; means for operating said device to an alternate position, comprising an arm reciprocably mounted on said operating member and movable radially thereof from a retracted position, to which it is biased, to a projected position wherein it is operatively engageable with said device when the operating member is rotated in one direction; means movably mounted on the operating member for moving the arm to said projected position; means on the casing engageable by said arm-projecting means in the rotation of the operating member and arranged so as to effect operation of the arm-projecting means, and thereby projection of said arm, when the operating member is rotated in said one direction to a predetermined position; the arrangement being such that continued rotation of the operating member effects engagement of the arm with said device and movement of the same to its alternate position; said means on the casing engageable by said arm-projecting means being arranged so that it is disengaged from the arm-projecting means upon said engagement of the arm with the device, the arm and the device being arranged so that friction between them serves to maintain their interengagement in said movement of the device to its alternate position; means responsive to a condition external of the valve structure for retaining the device in its alternate position while said condition is normal, so that upon subsequent disengagement of the arm from the device the arm returns to its biased retracted position, thereby permitting farther rotation of the members in said one direction; and additional means for influencing flow through said passage and operatively adjustable by said farther rotation of the members.

10. A valve structure according to claim 9 wherein said means operatively interconnecting the operating member and the closure member comprises a lug fixed to one of the members and having a lost-motion connection with the other of the members when said arm is in its projected position; and including means operated by return of said arm to its retracted position for rendering said lost-motion connection tight.

11. A valve structure according to claim 9 wherein said means operatively interconnecting the operating member and the closure member comprises a lug fixed to the closure member and having a lost-motion connection with the operating member when said arm is in its projected position; and including means operated by return of said arm to its retracted position for rendering said lost-motion connection tight.

12. A valve structure according to claim 9 wherein said operating member has an opening extending in a direction substantially parallel to its axis of rotation and spaced therefrom; wherein said means operatively interconnecting the operating member and the closure member comprises a lug, fixed to the closure member and projecting into said operating-member opening, of such dimension relative to said opening that there is a space between the lug and a wall of the opening such as to permit relative rotation of the members through a limited range; and wherein said arm has a portion arranged so that it closes said space, and thereby prevents said relative rotation of the members, only when the arm is in retracted position.

13. A valve structure according to claim 9 wherein said closure member is hollow; and wherein said additional flow-influencing means comprises valve means coacting with the closure member and connected to the casing so that said farther rotation of the members effects operative adjustment of said valve means.

14. A valve structure according to claim 9 wherein said closure member is hollow; wherein said additional flow-influencing means comprises a thermostatic valve coacting with the closure member and controlling flow to the aperture thereof; and including a threaded connection between said thermostatic valve and the casing arranged so that said farther rotation of the members effects operative adjustment of the thermostatic valve.

15. In a valve structure: a casing having a cylindrical internal cavity, and a pair of passages leading, respectively, from a side and one end of the cavity to the exterior of the casing; a generally cup-shaped closure member rotatable in said cavity coaxially therewith between open and closed positions, the open end of the closure member facing and communicating with said one end of the cavity; means sealingly extending to the exterior of the casing for rotating said closure member; said closure member having a side opening communicating with said casing side-passage when the closure member is in said open position; a closure element freely carried by the closure member, said element having a surface shaped so that it conforms closely to the side wall of the cavity and of a size to cover said side passage when the closure member is in closed position; a spring biasing said element so as to maintain said surface in engagement with the side wall of the cavity; means interconnecting the closure member and the casing and arranged so that rotation of the closure member effects also axial movement thereof; and additional means for influencing flow through said cavity and operatively adjustable by said axial movement of the closure member.

16. A valve structure according to claim 15 wherein said additional flow-influencing means comprises valve means mounted on said closure member and controlling flow through said side opening thereof.

17. A valve structure according to claim 15 wherein said additional flow-influencing means comprises valve means mounted on said closure member and controlling flow through said side opening thereof, and means sealingly extending to the exterior of the casing, and responsive to a condition external of the valve structure, for operating said valve means.

18. A valve structure according to claim 15 wherein said additional flow-influencing means comprises valve means mounted on said closure member and controlling flow through said side opening thereof; and wherein said interconnecting means comprises means, including a threaded connection between the closure member and the casing, arranged so that rotation of the closure member effects operative adjustment of said valve means.

19. A valve structure according to claim 15 wherein said additional flow-influencing means comprises a valve disk cooperable with said open end of the closure member.

20. A valve structure according to claim 15 wherein said additional flow-influencing means comprises a valve disk cooperable with said open end of the closure member; and wherein said interconnecting means comprises means inside the closure member, and including a threaded connection between the closure member and the casing, arranged so that rotation of the closure member can effect operation of said valve disk.

References Cited in the file of this patent

UNITED STATES PATENTS

| | | |
|---|---|---|
| 2,198,896 | Wetzel | Apr. 30, 1940 |
| 2,650,028 | Grayson | Aug. 25, 1953 |